US007645717B2

(12) United States Patent
Dhingra et al.

(10) Patent No.: US 7,645,717 B2
(45) Date of Patent: Jan. 12, 2010

(54) NANO-SCALE DMC CATALYST PARTICLES

(75) Inventors: Sandeep S. Dhingra, Midland, MI (US); Karla F. Mabe, Midland, MI (US); Keith Jeffrey Watson, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 283 days.

(21) Appl. No.: 10/557,831

(22) PCT Filed: May 21, 2004

(86) PCT No.: PCT/US2004/016394

§ 371 (c)(1), (2), (4) Date: Jan. 8, 2007

(87) PCT Pub. No.: WO2004/105944

PCT Pub. Date: Dec. 9, 2004

(65) Prior Publication Data

US 2007/0191216 A1    Aug. 16, 2007

(51) Int. Cl.
*B01J 27/26* (2006.01)
(52) U.S. Cl. .................. 502/175; 502/172
(58) Field of Classification Search .......... 502/172, 502/175
See application file for complete search history.

(56) References Cited

U.S. PATENT DOCUMENTS

| 3,278,457 A | 10/1966 | Milgrom |
| 3,278,458 A | 10/1966 | Belner |
| 3,278,459 A | 10/1966 | Herold |
| 3,404,109 A | 10/1968 | Milgrom |
| 3,427,256 A | 2/1969 | Milgrom |
| 3,427,334 A | 2/1969 | Belner |
| 3,427,335 A | 2/1969 | Herold |
| 4,355,188 A * | 10/1982 | Herold et al. ............... 568/620 |
| 5,010,187 A | 4/1991 | Heuvelsland |
| 5,470,813 A | 11/1995 | Le-Khac |
| 5,639,705 A | 6/1997 | Bowman et al. |
| 5,900,384 A | 5/1999 | Soltani-Ahmadi et al. |
| 5,998,672 A * | 12/1999 | Soltani-Ahmadi et al. .. 568/620 |
| 2002/0183482 A1 | 12/2002 | Harre et al. |
| 2003/0013604 A1* | 1/2003 | Grosch et al. ............... 502/175 |

FOREIGN PATENT DOCUMENTS

| WO | WO-97/26080 A1 | 7/1997 |
| WO | WO-01/39883 A1 | 6/2001 |
| WO | WO-01/44347 A1 | 6/2001 |

OTHER PUBLICATIONS

Eriksson S et al.: Preparation of catalysts from microemulsions and their applications in heterogeneous catalysis: Applied Catalysis A: General, Elsevier Science, Amsterdam, NL, vol. 265, No. 2, Jul. 8, 2004, pp. 207-219, XP004508849.

* cited by examiner

*Primary Examiner*—Elizabeth D Wood

(57) ABSTRACT

Nano-scale DMC catalyst complexes are highly active alkylene oxide polymerization catalysts. Thy show a greatly improved ability to catalyze the formation of EO-capping onto secondary hydroxyl-terminated polyethers. The catalysts can be prepared by precipitation in the dispersed adequous phase of a water-in-oil emulsion.

8 Claims, No Drawings

NANO-SCALE DMC CATALYST PARTICLES

This invention relates to methods for making metal cyanide catalyst complexes and to methods for polymerizing alkylene oxides in the presence of a metal cyanide catalyst.

Polyethers are prepared in large commercial quantities through the polymerization of alkylene oxides such as propylene oxide and ethylene oxide. This polymerization reaction is usually conducted in the presence of an initiator compound and a catalyst. The initiator compound usually determines the functionality (number of hydroxyl groups per molecule of the polymer) and in some instances imparts some desired functionality. The catalyst is used to provide an economical rate of polymerization.

Metal cyanide complexes are becoming increasingly important alkylene oxide polymerization catalysts. These complexes are often referred to as "double metal cyanide" or "DMC" catalysts, and are the subject of a number of patents, including, for example, U.S. Pat. Nos. 3,278,457, 3,278,458, 3,278,459, 3,404,109, 3,427,256, 3,427,334, 3,427,335 and 5,470,813, among many others. In some instances, these complexes provide the benefit of fast polymerization rates and narrow polydispersities. Additionally, these catalysts are associated with the production of polyethers having very low levels of monofunctional unsaturated compounds.

A shortcoming of conventional DMC catalysts is their inability to efficiently polymerize poly(ethylene oxide) endcaps onto poly(propylene oxide) polyols to form polyols terminated with primary hydroxyl groups. The higher reactivity of the primary hydroxyl groups (together with some increased hydrophilicity) make the EO-capped polyols particularly useful to make flexible polyurethane foam and reaction injection molded (RIM) polyurethanes and polyurethane-ureas. Conventional anionic polymerization catalysts such as alkali metal hydroxides and alkaline earth hydroxides very efficiently polymerize ethylene oxide onto the chain ends of polypropylene oxide) to form poly(oxyethylene) EO-capped polyols. This feature allows the EO-capped polyols to be produced in a single polymerization process, by sequentially polymerizing propylene oxide and then ethylene oxide in the presence of the catalyst. When this is attempted using DMC catalysts, most of the ethylene oxide tends to form very high molecular weight poly(ethylene oxide), rather than forming the desired end-caps. The result is a mixture of a poly(propylene oxide) (PO) homopolymer with a small proportion of a high molecular weight poly ethylene oxide (EO) homopolymer. The end groups of the poly(PO) are almost exclusively secondary hydroxyls. The difficulty in forming EO-capping increases with increasing molecular weight of the poly(PO) polymer. No effective method has been developed to EO-cap poly(PO) polymers of greater than about 1000 molecular weight.

Thus, it would be desirable to provide a DMC catalyst that more efficiently catalyzes the EO-capping reaction. It would be further desirable to provide a DMC catalyst that efficiently polymerizes propylene oxide, as well.

In one aspect, this invention is a metal cyanide catalyst in the form of particles having an average particle size, as determined by transmission electron spectroscopy, of from about 20 to about 500 nm.

In a second aspect, this invention is a process for making a metal cyanide catalyst comprising (A) forming an emulsion having a plurality of water droplets dispersed in an immiscible continuous phase, wherein the water droplets contain a transition metal cyanide compound and a metal salt that reacts with the transition metal cyanide compound to form a water-insoluble metal cyanide catalyst, and (B) subjecting the emulsion to conditions such that the transition metal cyanide compound and the metal salt react in the water droplets to form the water-soluble metal cyanide catalyst.

In a third aspect, this invention is a process for making a metal cyanide catalyst comprising A) forming a first emulsion of first water droplets dispersed in an immiscible continuous phase, wherein the first water droplets contain a transition metal cyanide compound;

B) forming a second emulsion of second water droplets dispersed in an immiscible continuous phase, where the second water droplets contain a dissolved metal salt that reacts with the transition metal cyanide compound to form a water-insoluble metal cyanide catalyst;

C) mixing the first and second emulsions under conditions such that said first water droplets contact said second water droplets; and D) subjecting the resulting mixture to conditions such that the transition metal cyanide compound and the metal salt react in the water droplets to form the water-soluble metal cyanide catalyst.

In a fourth aspect, this invention is a process wherein a metal cyanide catalyst in the form of particles having an average particle size, as determined by transmission electron spectroscopy, of from about 20 to about 300 nm is mixed with an alkylene oxide and the resulting mixture subjected to conditions including an elevated temperature sufficient to polymerize the alkylene oxide to form a poly(alkylene oxide).

In a fifth aspect, this invention is a process wherein a poly(propylene oxide) polymer is EO-capped, comprising contacting the polypropylene oxide) polymer with ethylene oxide under polymerization conditions in the presence of a catalytically effective amount of a metal cyanide catalyst in the form of particles having an average particle size, as determined by transmission electron spectroscopy, of from about 20 to about 500 nm.

In yet another aspect, this invention is a process wherein a metal cyanide catalyst is mixed with an alkylene oxide and the resulting mixture subjected to conditions including an elevated temperature sufficient to polymerize the alkylene oxide to form a poly(alkylene oxide), wherein the metal cyanide catalyst is the product of a process comprising (A) forming an emulsion having a plurality of water droplets dispersed in an immiscible continuous phase, wherein the water droplets contain a transition metal cyanide compound and a metal salt that reacts with the transition metal cyanide compound to form a water-insoluble metal cyanide catalyst, and (B) subjecting the emulsion to conditions such that the transition metal cyanide compound and the metal salt react in the water droplets to form the water-soluble metal cyanide catalyst.

In a further aspect, this invention is a process wherein a metal cyanide catalyst is mixed with an alkylene oxide and the resulting mixture subjected to conditions including an elevated temperature sufficient to polymerize the alkylene oxide to form a poly(alkylene oxide), wherein the metal cyanide catalyst is the product of a process comprising A) forming a first emulsion of first water droplets dispersed in an immiscible continuous phase, wherein the first water droplets contain a transition metal cyanide compound;

B) forming a second emulsion of second water droplets dispersed in an immiscible continuous phase, where the second water droplets contain a dissolved metal salt that reacts with the transition metal cyanide compound to form a water-insoluble metal cyanide catalyst;

C) mixing the first and second emulsions under conditions such that said first water droplets contact said second water droplets; and D) subjecting the resulting mixture to conditions such that the transition metal cyanide compound and the metal salt react in the water droplets to form the water-soluble metal cyanide catalyst.

The DMC catalyst complex of the invention includes a water-insoluble salt, generally complexed with water and optionally an organic complexing agent. The water-insoluble salt is a salt of an anionic radical made up of a transition metal ion that is coordinated to cyanide (CN—) and optionally other coordinating groups, and a metal cation (designated below as "M") that forms a water-insoluble salt with the anionic radical. The anionic radical can be represented as $M^1(CN)_r(X)_t$, wherein $M^1$ is the transition metal ion, X is a coordinating group other than cyanide and r and t are numbers that represent the number of CN– and X groups, respectively, that are coordinated with the $M^1$ ion. r is generally at least 4, preferably 5 and more preferably 6, and t is generally no greater than 2, preferably no greater than 1 and most preferably zero. r+t will usually equal 6. $M^1$ is preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ or $V^{+5}$. Among the foregoing, those transition metals in the plus-three oxidation state are more preferred. $Co^{+3}$ and $Fe^{+3}$ are even more preferred and $Co^{+3}$ is most preferred. $Co(CN)_6^3$ is the most preferred anionic radical.

The metal cation is preferably a metal ion selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M is more preferably $Zn^{+2}$, $Fe^{+2}$, $Co^{+2}$, $Ni^{+2}$, $La^{+3}$ or $Cr^{+3}$. M is most preferably $Zn^{+2}$. A mixture of metal ions may be used.

The metal cation is generally present in a stoichiometric excess in relation to the amount of anionic radical, i.e., the metal cation and anionic radical do not by themselves form an electrostatically neutral salt. It is preferred that the insoluble salt contain from about 2 to about 4, especially about 3 to about 4 metal atoms per transition metal atom supplied by the anionic radical.

Because the metal atom and anionic radical do not form an electrostatically neutral salt, additional anions are present in the water-insoluble salt. At least some of those additional anions are anions that do not contain a transition metal atom. Preferred such additional anions include halides (especially chloride and bromide), sulfate, nitrate, hydroxide and the like.

The water-insoluble salt may also contain a proportion of anions of the structure $M^2(X)_6$, wherein $M^2$ is defined in the same way as $M^1$ and X is as defined before. Preferred groups X include anions such as halide (especially chloride), hydroxide, sulfate, carbonate, oxalate, thiocyanate, isocyanate, isothiocyanate, $C_{1-4}$ carboxylate and nitrite ($NO_2$—), and uncharged species such as CO, $H_2O$ and NO. Particularly preferred groups X are NO, $NO_2$— and CO.

Thus, the water-insoluble salt can be represented by the formula

  (I)

wherein b, c, d and e represent numbers that reflect an electrostatically neutral salt. Sometimes, the formula of water-insoluble salts of this type has been represented in a form such as

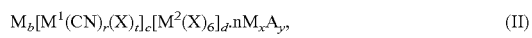  (II)

wherein b, c and d represent numbers that together reflect an electrostatically neutral salt, n represents the relative number of $M_xA_y$ groups and x and y are numbers that reflect an electrostatically neutral salt of M and A. For purposes of the invention, representations (I) and (II) are regarded as equivalent, and are not considered to represent the particular arrangement of the atoms and radicals in space. b, c and e are positive numbers. d is zero or a positive number and is preferably zero. The number of M atoms is preferably about 2 to about 4, especially about 3 to about 4 times the number of the total of $M^1$ and $M^2$ atoms.

The water-insoluble salt is optionally complexed with one or more organic complexing agents. Complexing agents that are useful in DMC catalyst complexes are well known, and include, for example, alcohols, aldehydes, ketones, ethers, amides, nitrites, sulfides, sulfones, sulfoxides and the like.

Suitable alcohols include monoalcohols and polyalcohols. Suitable monoalcohols include methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol, 1-t-butoxy-2-propanol and the like. Suitable monoalcohols also include halogenated alcohols such as 2-chloroethanoL 2-bromoethanol, 2-chloro-1-propanol, 3-chloro-1-propanol, 3-bromo-1-propanoL 1,3-dichloro-2-propanol, 1-chloro-2-methyl-2-propanol as well as nitroalcohols, keto-alcohols, ester-alcohols, cyanoalcohols, and other inertly substituted alcohols.

Suitable polyalcohols include ethylene glycol, propylene glycol glycerine, 1,1,1-trimethylol propane, 1,1,1-trimethylol ethane, 1,2,3-trihydroxybutane, pentaerythritol, xylitol, arabitol mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside, and the like. Low molecular weight polyether polyols, particular those having an equivalent weight of about 350 or less, more preferably about 125-250, are also useful complexing agents.

Suitable aldehydes include formaldehyde, acetaldehyde, butyraldehyde, valeric aldehyde, glyoxal, benzaldehyde, toluic aldehyde and the like. Suitable ketones include acetone, methyl ethyl ketone, 3-pentanone, 2-hexanone and the like.

Suitable ethers include cyclic ethers such as dioxane, trioxymethylene and paraformaldehyde as well as acyclic ethers such as diethyl ether, 1-ethoxy pentane, bis(betachloro ethyl) ether, methyl propyl ether, diethoxy methane, dialkyl ethers of alkylene or polyalkylene glycols (such as ethylene glycol dimethyl ether, diethylene glycol dimethyl ether, triethylene glycol dimethyl ether and octaethylene glycol dimethyl ether), and the like.

Amides such as formamide, acetamide, propionamide, butyramide and valeramide are useful complexing agents. Esters such as amyl formate, ethyl formate, hexyl formate, propyl formate, ethyl acetate, methyl acetate, triethylene glycol diacetate and the like can be used as well. Suitable nitriles include acetonitrile, proprionitrile and the like. Suitable sulfides include dimethyl sulfide, diethyl sulfide, dibutyl sulfide, diamyl sulfide and the like. Suitable sulfones and sulfoxides include dimethylsulfoxide, tetramethylene sulfoxide, 2,2-sulfonyldiethanol, diemethyl sulfone and sulfolane (tetramethylene sulfone).

Preferred complexing agents are t-butanol, 1,2-dimethoxy ethane (glyme), 1-t-butoxy-2-propanol, polyether polyols having an equivalent weight of about 75-350 and dialkyl ethers of alkylene and polyalkylene glycols. Especially preferred complexing agents are t-butanol, glyme 1-t-butoxy-2-propanol, polyether polyols having an equivalent weight of 125-250 and a dimethyl ether of mono-, di- or triethylene glycol. t-Butanol and glyme are especially preferred.

The DMC catalyst complex is in the form of particles having an average particle size of from about 5 to about 500 nanometers, as determined by transmission electron spectroscopy, prior to exposing the catalyst to an alkylene oxide for polymerization. The particles preferably have a volume average particle size from about 10 nanometers, such as from about 40 nanometers, to about 300 nanometers, more preferably to about 250 nanometers, especially to about 200 nanometers, most preferably to about 150 nanometers.

The DMC catalyst complex can be prepared at such small particle sizes by precipitating it in the dispersed aqueous phase of a water-in-oil emulsion. In this method, water-soluble or -miscible precursor materials are brought together and subjected to reaction conditions within dispersed aqueous droplets in the emulsion. The catalyst complex forms and precipitates as very fine particles within the droplets.

The precursor materials include a water-soluble or -dispersible salt of the metal M and a transition metal cyanide compound. The salt of M is of the form $M_xA_y$, where M, x, A and y are as defined above. The transition metal cyanide compound is preferably of the formula $B_w[M^1(CN)_r(X)_t]$, where B represents hydrogen, an ammonium cation or an alkali metal ion and w is the absolute value of the valence of the $M^1(CN)_r(X)_t$ group. B is preferably not an alkali metal, as alkali metal by-products that form in the reaction tend to inactivate the catalyst and therefore must be removed. B is preferably hydrogen.

In a preferred embodiment, an aqueous solution of the M salt is prepared and formed into a water-in-oil emulsion by mixing the solution with one or more surfactants and an organic liquid that is immiscible with the aqueous solution. This is preferably done by first mixing the salt solution with the surfactants, and then dispersing this mixture with agitation into the organic phase. Conditions are selected such that the aqueous phase forms droplets of about 500 nm or smaller in diameter. The aqueous phase may constitute from about 0.5 to about 60% or more of the total weight of the emulsion, provided that the emulsion is stable and the droplets are of the desired size.

In the preferred embodiment, a solution or dispersion of the transition metal cyanide compound is prepared separately, and separately formed into a water-in-oil emulsion in similar manner. Preferred droplet sizes and aqueous phase contents are the same as for the emulsion of the M salt solution.

The separate solutions are then mixed under conditions at which the M salt and transition metal cyanide compound can react within the dispersed water droplets to form the DMC catalyst complex. The reaction generally proceeds well at temperatures above 0° C. up to 100° C. or more, but it is not generally necessary to heat or cool the mixture from approximately room temperature (15-30° C.). Agitation is continued to (1) maintain the small droplet size throughout the reaction and (2) promote collisions of droplets of the M salt solution and the transition metal cyanide compound solution or dispersion, so that the reactants contact each other and react. The time required to complete the reaction depends on the particular reactants and conditions, and may take from a few minutes to 20 hours or more.

It is preferred to provide about 2 to about 4, especially from about 3 to about 4, moles of M atoms per mole of transition metal atoms (i.e., $M^1$ and $M^2$ atoms). Accordingly, concentrations of the M salt and transition metal cyanide compound in the starting solution and the relative volumes of the starting aqueous phases are preferably selected in order to accomplish this.

It is preferred that the droplet sizes of the starting emulsions be similar to each other, such that the average droplet size of one of the emulsions is no larger than about 5 times, more preferably no larger than about 2 times, especially no larger than about 1.5 times that of the other starting emulsion. It is also preferred that the volumes of the disperse aqueous phases of the starting emulsions be similar to each other, such that the volume of the aqueous phase of one of the emulsions is no greater than about 5 times, preferably no greater than about 2 times, especially no greater than about 1.5 times that of the other starting emulsion. Having similar droplet sizes and aqueous phase volumes facilitates complete reaction, maintenance of the desired small droplet size and formation of the desired small particle size catalyst complex particles.

The complexing agent, if used, is conveniently added to the aqueous phase of one or both, preferably both, of the starting emulsions. The complexing agent may constitute, for example, from zero to about 70%, preferably about 10 to about 50%, of the combined weight of water and complexing agent in each of the aqueous phases. However, it is possible to wash the catalyst with the complexing agent after it has been precipitated and recovered.

The organic phase of the emulsion is one or more organic compounds that are liquid at the temperatures used and substantially immiscible with water. At the temperatures used, water is preferably soluble in the organic compounds to the extent no greater than about 5%, preferably to no greater than about 1% (w/w). The M salt and transition metal cyanide compound also should be significantly more soluble in the aqueous phase than in the organic phase, so that they do not migrate significantly to the organic phase. If a complexing agent is present in the aqueous phase, the complexing agent also should exhibit relatively lower miscibility with the organic phase than with the aqueous phase. Examples of suitable organic phase materials include hydrocarbons and C6 or higher alkanols having a boiling temperature of at least about 50° C. Suitable hydrocarbons may be linear, alicyclic, aromatic, alkyl-substituted aromatic or alicyclic compounds. Specific examples of suitable hydrocarbons include petroleum ether, toluene, benzene, hexane, heptane, isooctane, hexanol, decanol, octanol and the like.

The aqueous phase droplets are stabilized via at least one surfactant. Nonionic surfactants, such as poly(oxyethylene) ethers of alkyl- or dialkyl phenols, are particularly suitable. Examples of these include poly(oxyethylene) ethers of nonyl phenol or octyl phenol, such as poly(oxyethylene)$_5$ nonyl phenol ether and poly(oxyethylene)$_9$ octyl phenol ether. Nonionic silicone surfactants can also be used. Anionic and cationic surfactants can also be used. Sufficient surfactant is used to stabilize the aqueous phase droplets at the desired droplet size.

After the DMC catalyst complex precipitates, it can be recovered by solid-liquid separation techniques such as filtration and centrifuging. A preferred recovery method is to break the emulsion by adding a polar organic compound in which both water and the organic phase are miscible, and then removing the catalyst complex particles by centrifuging. It is also preferred to wash the recovered particles one or more times with water or a volatile polar organic compound (such as ethanol, acetone, dimethyl ether, low molecular weight polyethers, mono-or di-alkyl ethers of ethylene glycol or polyethylene glycol, and the like) in order to remove residual surfactant and organic phase materials. The recovered particles are also preferably dried to remove residual volatiles such as excess water, excess complexing agents, washing compounds and the like. Drying is preferably done under vacuum and reduced pressure.

The particles may be dispersed in a polyether and/or initiator compound to form a slurry, which is then stripped to remove the residual volatiles.

The catalyst complex of the invention is useful to polymerize alkylene oxides to make polyethers. In general, the process includes mixing a catalytically effective amount of the catalyst with an alkylene oxide under polymerization conditions and allowing the polymerization to proceed until the supply of alkylene oxide is essentially exhausted. The concentration of the catalyst is selected to polymerize the alkylene oxide at a desired rate or within a desired period of time.

An amount of catalyst sufficient to provide from about 5 to about 100,000 parts by weight metal cyanide catalyst complex per million parts combined weight of alkylene oxide, and initiator and comonomers, if present. More preferred catalyst levels are from about 20, especially from about 30, to about 50,000, more preferably to about 10,000 ppm, even more preferably to about 1500 ppm.

Among the alkylene oxides that can be polymerized with the catalyst complex of the invention are ethylene oxide, propylene oxide, 1,2-butylene oxide, styrene oxide, epichlorohydrin and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 70 weight %, especially up to 85 weight %, propylene oxide and up to about 30, especially 15, weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

Two polymerizations are of particular interest. The first of these is the polymerization of ethylene oxide onto a polypropylene oxide) homopolymer or copolymer having mainly terminal secondary hydroxyl groups. It has been found that the catalyst complex of the invention will cause ethylene oxide to polymerize onto a surprisingly high proportion of those terminal secondary hydroxyl groups to provide an EO-capped polyol with a significant proportion of primary hydroxyls. The proportion of end-groups that are EO-capped tends to decrease as the molecular weight of the polypropylene oxide) starting material increases. For those starting materials of about 1500 molecular weight or less, preliminary work has shown that greater than 45%, in some cases greater than 50% of the end groups can become EO-capped using the catalyst of the invention. For starting materials of about 1500-3000 molecular weight, 33-50% of end groups have been EO-capped using the catalyst of the invention. For starting materials of about 3000-4000 molecular weight, EO-capping of about 20-43% of the end groups have been achieved. Optimized polymerization and catalyst preparation methods are expected to further increase the proportion of end-groups that are EO-capped using the catalysts of the invention.

The second type polymerization of particular interest is the sequential polymerization of propylene oxide (or mixtures thereof with up to about 50% ethylene oxide), followed by a polymerization of ethylene oxide, using the same catalyst, to form block copolymers. EO-capping efficiencies obtained are similar to described in the preceding paragraph.

The polymerization reaction typically proceeds well at temperatures from about 25 to about 150° C. or more, preferably from about 80-130° C. A convenient polymerization technique involves charging the catalyst to a reactor and pressurizing the reactor with the alkylene oxide. An initiator or polyether compound is generally added prior to the introduction of the monomers, and as discussed above typically is combined with the catalyst complex ahead of time to form a catalyst slurry. Polymerization proceeds after a short induction period as indicated by a loss of pressure in the reactor. Induction periods often approximate zero with the catalyst of this invention. Once the polymerization has begun, additional alkylene oxide is conveniently fed to the reactor on demand until enough alkylene oxide has been added to produce a polymer of the desired equivalent weight.

Another convenient polymerization technique is a continuous method. In such continuous processes, the catalyst is continuously fed into a continuous reactor such as a continuously stirred tank reactor (CSTR) or a tubular reactor (usually as a slurry in initiator and/or polyether). A feed of alkylene oxide is introduced into the reactor and the product continuously removed. Initiator can be added continuously or intermittently, with the catalyst (such as in the form of a catalyst slurry in the initiator) or as a separate stream. Those catalysts exhibiting a particularly short induction period, such as less than 15 minutes, preferably less than 10 minutes, and especially less than 5 minutes, are particularly suitable for use in processes where the catalyst is added continuously.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated. Catalyst loadings are calculated from the starting materials and ignoring any associated water and initiator.

EXAMPLES 1-16

Stock solution A is prepared by mixing zinc chloride and water in a 1:2 weight ratio, with stirring until the salt is dissolved.

Stock solution B is prepared by mixing $K_2Co(CN)_6$ and water. The mixture is stirred until the salt dissolves, and hydrochloric acid (37%) solution is added over 10 minutes. Ratios of components are 1:3:3 ($K_2Co(CN)_6$: water:HCl solution). The mixture is cooled on an ice bath. A white precipitate (KCl) forms, which is separated by filtration. The resulting solution contains about 10.6% $H_3Co(CN)_6$ by weight.

Stock solution C is prepared by mixing poly(oxyethylene)$_5$ nonylphenyl ether (Igepal® CO-520 surfactant) and poly(oxyethylene)$_9$ octyl phenyl ether (Igepal®CO-630 surfactant) at a 2:1 weight ratio.

DMC Catalyst Example 1 is prepared as follows: 27 parts by weight of stock solution A are diluted with 19 parts water. 33.9 parts by weight of stock solution B are diluted with 12.1 parts water. 16 parts by weight of stock solution C is added to each of the diluted solutions, with shaking. Then, 28 parts by weight of petroleum ether are added to each of the diluted solutions, followed by shaking. Each diluted solution forms an water-in-oil emulsion with disperse phase droplet size estimated at below 500 nm. The diluted solutions are then mixed at room temperature and shaken at room temperature for about 17 hours. The ratios of starting materials provide approximately 4 moles of zinc atoms per mole of cobalt atom. The mixed solutions retain the form of a water-in-oil emulsion with small droplet size. A solid zinc hexacyanocobaltate catalyst complex precipitates with the dispersed aqueous phase droplets. The precipitated catalyst particles are recovered by adding approximately 320 parts by weight ethanol, shaking until a homogeneous (other than dispersed solids) mixture is formed, and centrifuging at 2800 rpm for 30 minutes. The liquid phase is decanted, and the particles are washed with ethanol and centrifuged three more times. The resulting particles are then dried under vacuum at 90° C. for 24 hours.

DMC Catalyst Example 2 is prepared in the same manner, except that 10 g of ethanol is added to each of the diluted solutions before adding stock solution C and petroleum ether.

DMC Catalyst Example 3 is prepared in the same manner as Example 1, except that 10 g of 2-methyl-2-propanol is added to each of the diluted solutions before adding stock solution C and petroleum ether.

DMC Catalyst Example 4 is prepared in the same manner as Example 1, except that 10 g of ethylene glycol dimethyl ether (glyme) is added to each of the diluted solutions before adding stock solution C and petroleum ether.

DMC Catalyst Examples 5-8 are prepared in the same manner as Examples 1-4, respectively, except that 43 parts by weight of stock solution B are diluted with 3 parts by weight water. In Examples 5-8, the ratios of starting materials provide approximately 3 moles of zinc atoms per mole of cobalt atom.

DMC Catalyst Examples 9-12 are prepared in the same manner as Examples 1-4, respectively, except that the recovered catalyst particles are dispersed (before drying) in a 700 molecular weight polypropylene oxide) triol (Voranol® 2070 polyol, from Dow Chemical) to form a slurry containing ~6% dispersed catalyst particles. The resulting slurry is dried under vacuum at 50° C. Samples of the particles are taken prior to breaking the emulsion (via ethanol addition), and after all ethanol washes are completed. The particle sizes are measured using transmission electron spectroscopy (TEM), and found to be as follows:

TABLE 1

| Example No. | Particle Size | |
| --- | --- | --- |
| | Before Washing | After Washing |
| 9 | ~48 nm | ~105 nm |
| 10 | Not Determined | ~170 nm |
| 11 | Not Determined | ~210 nm |
| 12 | Not Determined | ~71 nm |

DMC Catalyst Examples 13-16 are prepared in the same manner as Examples 1-4, respectively, except that the recovered catalyst particles are dispersed (before drying) in a 4000 molecular weight poly(propylene oxide) triol (Voranol® CP 4155 polyol, from Dow Chemical) to form a slurry containing ~6% dispersed catalyst particles. Again, the resulting slurry is dried under vacuum at 50° C.

EXAMPLE 17

Each of DMC Catalysts examples 1-16 is screened for activity in catalyzing the polymerization of propylene oxide. Screening is performed by adding a mixture of Voranol® 2070 polyol, propylene oxide and catalyst to a Wheaton vial equipped with a stir bar. Catalyst concentration is approximately 5000 ppm based on the weight of starting materials. The contents of the Wheaton vial are heated with stirring at 90° C. until polymerization of the propylene oxide has occurred (as observed by visual inspection of the vial). All are active polymerization catalysts for propylene oxide.

DMC Catalyst Example 9 is evaluated in a series of polymerization reactions (17A-17I) to evaluate its ability to polymerize propylene oxide and to catalyze EO-capping reactions. The polymerization reactions are conducted as follows: DMC Catalyst Example 9 is mixed with additional Voranol® 2070 polyol to provide enough catalyst to provide a catalyst level of approximately 1000 ppm in the product polymer. NMR analysis of the starting Voranol® 2070 polyol shows it to have a $M_n$ of about 681.5 and an average propylene oxide degree of polymerization of about 10.2. About 70 grams of the mixture are charged to a stirred Parr pressure reactor vessel and the vessel pressurized with nitrogen to 30 psig. The reaction mixture is heated to 110° C. and a measured amount of propylene oxide is added. Reaction of the propylene oxide begins almost immediately, indicating that the catalyst has a very short or no induction period before it becomes activated. When the propylene oxide polymerization is completed (as indicated by a constant reactor pressure), 30 ml of ethylene oxide are added to the reactor. Again, immediate and rapid polymerization of the ethylene oxide occurs. The reaction is continued until the ethylene oxide has all reacted, as indicated by the reactor achieving a constant pressure. The resulting polymers are opaque. They are recovered and analyzed for molecular weight ($M_n$), poly(propylene oxide) degree of polymerization, poly(ethylene oxide) degree of polymerization, primary hydroxyl groups and secondary hydroxyl groups by NMR. Results are summarized in Table 2 below.

TABLE 2

| Product No. | $M_n$ | mL PO added | mL EO added | Ave. Degree of Polymerization | | 1° OH/ molecule | 2° OH/ molecule | % 1° OH |
| --- | --- | --- | --- | --- | --- | --- | --- | --- |
| | | | | PO | EO | | | |
| Control | 681.5 | 0 | 0 | 10.2 | 0 | 0 | 3.15 | 0 |
| 17A | 1090 | 21 | 30 | 13.1 | 5.45 | 1.73 | 1.51 | 53 |
| 17B | 1190 | 42 | 30 | 15.2 | 4.95 | 1.53 | 1.59 | 49 |
| 17C | 1425 | 63 | 30 | 18.8 | 5.55 | 1.56 | 1.66 | 48 |
| 17D | 1614 | 84 | 30 | 22.2 | 5.35 | 1.45 | 1.73 | 45 |
| 17E | 2172 | 190 | 30 | 32.2 | 4.85 | 1.13 | 2.01 | 35 |
| 17F | 2600 | 210 | 30 | 38.9 | 5.60 | 1.06 | 2.08 | 33 |

TABLE 2-continued

| No. | Product $M_n$ | mL PO added | mL EO added | Ave. Degree of Polymerization | | 1° OH/ molecule | 2° OH/ molecule | % 1° OH |
|---|---|---|---|---|---|---|---|---|
| | | | | PO | EO | | | |
| 17G | 2987 | 250 | 30 | 45.2 | 6.2 | 1.05 | 2.10 | 33 |
| 17H | 3490 | 290 | 30 | 53.4 | 6.8 | 0.94 | 2.16 | 30 |
| 17I | 3798 | 370 | 30 | 60.1 | 4.95 | 0.70 | 2.35 | 22 |

The data in Table 2 illustrates that the catalyst actively polymerizes both propylene oxide and ethylene oxide. A surprisingly high proportion of the end groups of the product polyol are primary hydroxyl, particularly when the product molecular weight is below about 3000 (up to about 2714 prior to EO addition). This data indicates that a significant proportion of the ethylene oxide forms terminal EO caps on the previously-formed poly(propylene oxide) polymer, instead of forming high molecular weight poly(ethylene oxide) homopolymers.

Catalyst Examples 10-12 are evaluated in a manner similar to experiment 17C, to produce an EO-capped polypropylene oxide) of approximately 1500 $M_n$. Catalyst Example 10 yields a polymer in which about 48-49% of the end groups are EO-capped. Catalyst 11 yields a polymer in which about 43-46% of the end-groups are EO-capped. Catalyst 12 yields a polymer in which about 46-48% of the end groups are EO-capped.

Catalyst Example 12 is again evaluated, at a catalyst level of 5000 ppm. Under these conditions, a polyol of about 2500 MW is produced having about 48% EO capping, and a polyol of about 3200 MW is produced having about 38% EO capping.

EXAMPLE 18

Catalyst Example 9 is repeated, except that the ethanol used to break the emulsion and wash the catalyst particles is replaced with approximately equal amounts of tri(ethyleneglycol) monomethyl ether. The resulting catalyst actively polymerizes PO with a minimal induction period, per the vial screening test described in Example 17.

EXAMPLE 19

Zinc chloride (8.995 parts) and water (29.725 parts) are mixed with stirring until the salt is dissolved.

A $H_3Co(CN)_6$ solution is prepared in the general manner described in Example 1.

A surfactant mixture is prepared by mixing poly(oxyethylene)$_5$ nonylphenyl ether (Igepal® CO-520 surfactant) and poly(oxyethylene)$_9$ octyl phenyl ether (Igepal®CO-630 surfactant) at a 2.75:1 weight ratio.

DMC Catalyst Example 19 is prepared as follows: 43.274 parts by weight of the $H_3Co(CN)_6$ solution are diluted with 2.726 parts water. 16.004 parts by weight of the surfactant mixture is added to each of the $ZnCl_2$ and $H_3Co(CN)_6$ solutions, with shaking. Then, 37.965 parts by weight of hexane are added to each of the solutions, followed by shaking. Each solution forms an water-in-oil emulsion with disperse phase droplet size estimated at below 500 nm. The solutions are then mixed at room temperature and shaken at room temperature for about 17 hours. The ratios of starting materials provide approximately 4 moles of zinc atoms per mole of cobalt atom. The mixed solutions retain the form of a water-in-oil emulsion with small droplet size. A solid zinc hexacyanocobaltate catalyst complex precipitates with the dispersed aqueous phase droplets. The precipitated catalyst particles are recovered by ethanol washing as described in Example 1. The recovered catalyst particles are dispersed (before drying) in a 700 molecular weight poly(propylene oxide) triol (Voranol® 2070 polyol, from Dow Chemical) to form a slurry containing 6% dispersed catalyst particles. The resulting slurry is dried under vacuum at 50° C. for four hours and then overnight at 40° C. at atmospheric pressure.

The resulting catalyst actively polymerizes propylene oxide in the vial screening test described in Example 17.

EXAMPLE 20

DMC Catalyst Example 20 is prepared as follows: 43.274 parts by weight of the $H_3Co(CN)_6$ solution prepared as described in Example 19 are diluted with 2.726 parts water. A $ZnCl_2$ solution is also prepared as in Example 19. 32.007 parts by weight of the surfactant mixture from Example 19 is added to each of the solutions, with shaking. 9.995 parts of ethylene glycol dimethyl ether are added to each of the solutions. Then, 75.931 parts by weight of hexane are added to each of the solutions, followed by shaking. The solutions are then used in the manner described in Example 19 to prepare a DMC catalyst.

EXAMPLE 21

Zinc chloride (8.995 parts) and water (29.725 parts) are mixed with stirring until the salt is dissolved.

A $H_3Co(CN)_6$ solution is prepared in the general manner described in Example 1.

A surfactant mixture is prepared by mixing poly(oxyethylene)$_5$ nonylphenyl ether (Igepal® CO-520 surfactant) and poly(oxyethylene)$_9$ octyl phenyl ether (Igepal®CO-630 surfactant) at a 2.75:1 weight ratio.

DMC Catalyst Example 21 is prepared as follows: 43.274 parts by weight of the $H_3Co(CN)_6$ solution are diluted with 2.726 parts water. 32.007 parts by weight of the surfactant mixture is added to each of the zinc chloride and $H_3CO(CN)_6$ solutions, with shaking. Then, 75.931 parts by weight of petroleum ether are added to each of the diluted solutions, followed by shaking. The diluted solutions are then used in the general manner described in Example 1 to prepare a DMC catalyst.

EXAMPLE 22

Example 21 is repeated, except 9.995 parts by weight ethylene glycol dimethyl ether is added to each of the diluted solutions.

EXAMPLE 23

Example 22 is repeated, except the amount of surfactants and petroleum ether are each reduced by half.

EXAMPLE 24

A mixture of 40 parts isooctane and 10 parts of Igepal® DM-430 surfactant (a poly(oxyethylene) 3,5-dialkylphenyl ether) is added into each of two polypropylene bottles. Into the first bottle are added 1.85 parts of a 40 wt-% $ZnCl_2$ solution in water and 2.5 parts of glyme. Into the second bottle is added 2.9 parts of a 10% aqueous solution of $H_3Co(CN)_6$. Both bottles are separately shaken to disperse mix their contents. The contents of the bottles are then combined and shaken overnight at room temperature. The resulting dispersion is diluted to about 500 g with ethanol, and centrifuged for 20 minutes to produce a semi-clear gel (containing the catalyst particles) and a supernatant fluid. The supernatant is decanted, and the gel is washed with ethanol and centrifuged twice more. The resulting product is diluted with 70 parts of Voranol® 2070 polyol, and purified by rotary evaporation at 40° C. overnight.

This catalyst has a volume average particle size of about 40 nm. It is evaluated in sequential propylene oxide/ethylene oxide polymerizations in the general manner described in Example 17 (at a level of 5000 ppm), to produce poly(oxyethylene)-capped poly(PO) polyols. A 2800 MW polyol is produced having 51% primary hydroxyls. 2900 and 3600 MW polyols are produced having 45% primary hydroxyls. A 3800 MW polyol is produced having 32% primary hydroxyls.

What is claimed is:

1. A process for making a metal cyanide catalyst comprising
    (A) forming an emulsion having a plurality of water droplets dispersed in an immiscible continuous phase, wherein the water droplets contain a transition metal cyanide compound and a metal salt that reacts with the transition metal cyanide compound to form a water-insoluble metal cyanide catalyst, and
    (B) subjecting the emulsion to conditions such that the transition metal cyanide compound and the metal salt react in the water droplets to form the water-soluble metal cyanide catalyst; wherein the catalyst is in the form of particles having an average particle size, as determined by transmission electron spectroscopy, of from about 5 to about 500 nanometers.

2. The process of claim 1, wherein step (A) is conducted by
    A1) forming a first emulsion of first water droplets dispersed in an immiscible continuous phase, wherein the first water droplets contain a transition metal cyanide compound;
    A2) forming a second emulsion of second water droplets dispersed in an immiscible continuous phase, where the second water droplets contain a dissolved metal salt that reacts with the transition metal cyanide compound to form a water-insoluble metal cyanide catalyst; and
    A3) mixing the first and second emulsions under conditions such that said first water droplets contact said second water droplets.

3. The process of claim 1, wherein the immiscible continuous phase includes a surfactant.

4. The process of claim 1, wherein the immiscible continuous phase includes a liquid organic compound that is immiscible with water.

5. The process of claim 4, wherein the immiscible continuous phase includes a hydrocarbon, a $C_6$ or higher alkanol, or a mixture of at least one hydrocarbon and at least one $C_6$ or higher alkanol.

6. The process of claim 1, wherein the catalyst is treated with a ligand.

7. The process of claim 6, wherein the ligand is present during step b).

8. The process of claim 1, wherein the metal cyanide compound is a hexacyanocobaltate compound and the metal salt is a zinc salt.

* * * * *